UNITED STATES PATENT OFFICE.

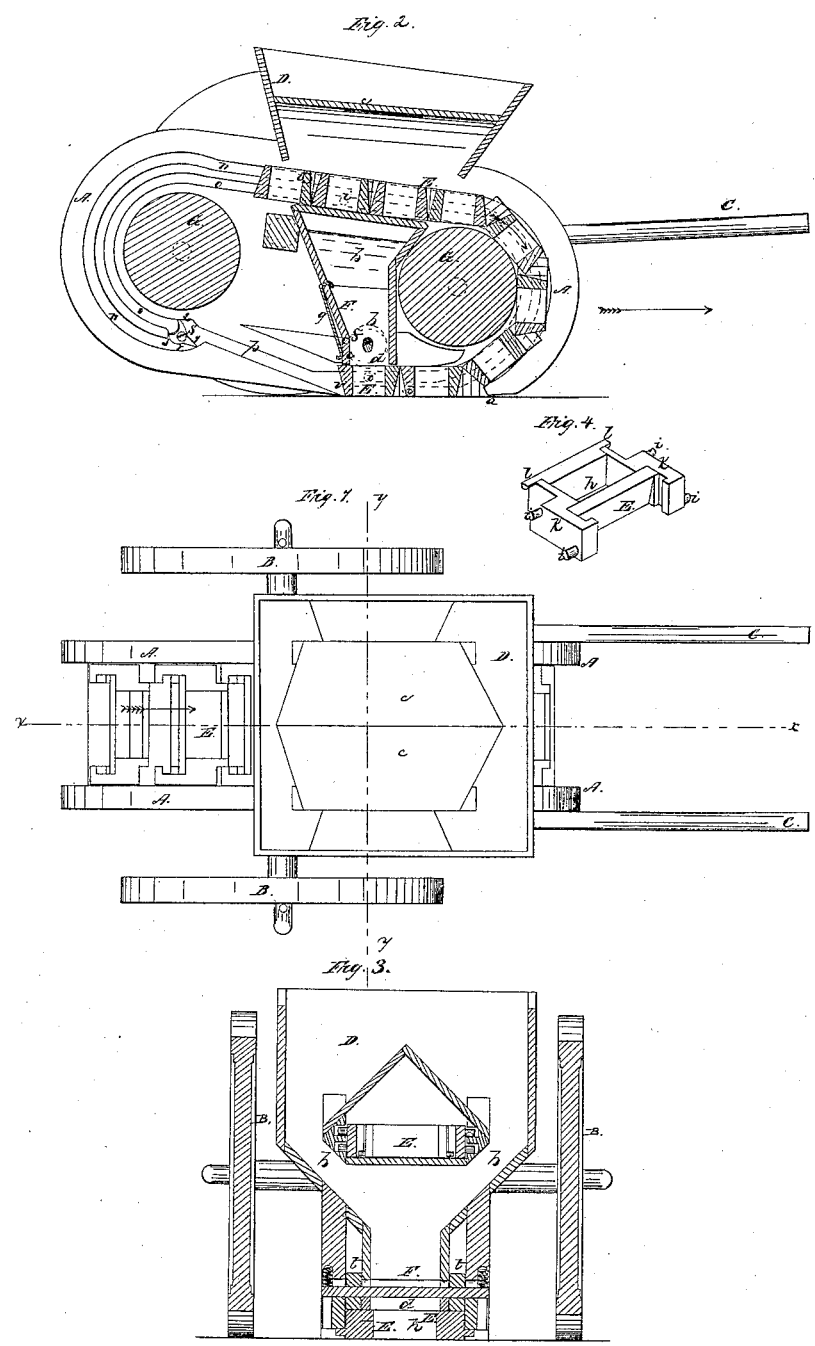

GEORGE I. WASHBURN, OF WORCESTER, MASSACHUSETTS, ASSIGNOR TO HIMSELF AND ANSON L. HOBART.

BRICK-MACHINE.

Specification of Letters Patent No. 18,226, dated September 15, 1857.

*To all whom it may concern:*

Be it known that I, GEO. I. WASHBURN, of Worcester, in the county of Worcester and State of Massachusetts, have invented a new and useful Machine for Molding Bricks and Depositing Them on the Ground to be Dried Without the Labor of Handling Them, of which the following is a full, clear, and exact description, reference being had to the accompanying drawings, making part of this specification, in which—

Figure 1 is a plan; Fig. 2 a longitudinal section on the line $x$, $x$, of Fig. 1; Fig. 3 a transverse vertical section on the line $y$, $y$ of Fig. 1; Fig. 4 detail to be referred to.

In brick making a considerable item of labor and expense is the work of the "off bearer" or person who carries the molded brick from the molder to a smooth piece of ground nearby, where the bricks are laid down each by itself to dry and harden before they are taken to the kiln.

The object of my present invention is to dispense with the labor of the "off bearer," and reduce the expense of brick making; this I have done by the peculiar construction of my improved molding and "off bearing" machine the construction and operation of which I will now proceed to describe, that others skilled in the art may understand the manner in which I have carried out my invention.

In the drawings A, is the carriage supported by the wheels B, and intended to be moved over the ground by a horse drawing in the shafts C, the lower part of the carriage in front of the axle, resting upon the ground as at $a$ Fig. 2. On the top of this carriage A is secured a hopper D, in which the tempered clay is placed, it is constructed with a guide $c$, (Fig. 3) which rests upon the edge of the carriage and deflects the clay off toward the sides so that it passes down through the openings $b$, in the sides of the carriage through a spout F, to the mold E, as it passes beneath the outlet $d$, of the spout. To prevent this outlet at $d$, from being broken away by small stones or other obstructions I have made the rear lip at $e$, movable, it is pivoted at $f$ to the back of the spout F, and is held up by a spring $g$ which bears against it.

I will now explain the construction of the molds and the manner in which they are filled while they remain stationary upon the ground and the hopper passes over them.

Near each end of the carriage A, and running in suitable bearings in it are the drums G which carry the endless belt of molds E. These molds are constructed and attached together in the following manner: Each mold is formed as shown in Fig. 4— the central rectangular space at $h$, is the cavity for the reception of the clay; the ends of the mold E project at each end at $k$ and are furnished with pins $i$ $i'$ placed above and below a horizontal plane passing through the middle of the mold—on the inside of the projecting ends $k$, are the grooves $m$, and on the opposite side of the mold are two pins $l$, which fit in the grooves $m$, of the next mold E, of the series. The carriage A is formed of two sides or planks, one of which is shown in elevation in Fig. 2; on the inner face of this are cut grooves $n$, $o$, which run into one groove $p$, near the lower side of the carriage; a switch $r$ is placed at the junction of the grooves $n$, and $o$, with one end of the groove $p$. The pins $i$ of the molds E traverse in the groove $o$, and the pins $i'$ in the grooves $n$.

The molds are all joined together forming a continuous belt as seen in Fig. 1 (a portion of them being removed from Fig. 2 to show the grooves $n$ and $o$) which travels in the direction of the arrow over the drums G, the pins $i$ $i'$ occupying their respective grooves (Fig. 2) until at each mold E reaches a position at the lower side of the carriage beneath the spout F, and receiving its charge of clay, when these pins enter the single inclined groove $p$ by which means the molds are raised from the ground with the sides or faces of the mold kept in a perpendicular position until the pin $i$ strikes the switch $r$. This switch which is formed as shown in Fig. 2 is pivoted to the inner face of the carriage at $s$ in a recess at the end of the grooves $n$ and $o$ and has a point 1 at its front side and two projections 2 and 3 at the rear end, so that as the pin $i$ passes up the groove $p$ to enter the groove $o$, it strikes the shoulder 2 of the switch and vibrates it so as to throw the point 1 across the groove $p$, the switch is then in position to guide the pin $i'$ into the groove $n$, and as this pin enters its groove it strikes the shoulder 3 and throws the switch back again, thus leading the pins alternately into their respective grooves.

As the spout F passes over the molds, the latter remain stationary upon the ground, and while they are in this position, two rollers *b* placed between the sides of the spout F and the carriage A (they are seen dotted in Fig. 2 and in section in Fig. 3) bear upon the upper edges of the molds and hold them immovably to the surface of the ground. The rollers *b* are carried on an axle having bearings in slots in the sides of the carriage A, which axle is held down by springs *u*, placed over them. By this arrangement the molds are allowed to accommodate themselves to any slight inequalities of the surface of the ground, while they are pressed down upon it by a portion of the weight of the machine, a preponderance of weight being placed in front of the axle.

The sides of the carriage A are cut away on the lower side from *a* to *v* and the inclined groove *p* runs out to the outer edge of the side at *v* to allow the molds to be slipped into place and be joined together by entering the pins *l* of one block into the grooves *m* of the next one.

The operation of this machine is as follows: The tempered clay is placed in the hopper D and the machine is drawn in the direction of the arrow 5 over the ground on which the molded bricks are to be left to dry, the clay passes down through the passages *b* and spout F, to the mold which is at the moment beneath it, the friction of the molds upon the ground being sufficient to cause the endless belt of blocks to revolve over the drums G, in the direction of their arrows, Fig. 2, and as each mold is filled, the pins *i i'* enter and ascend the inclined groove *p*, by which the mold is raised from the ground in the proper position as before stated, and the molded brick is left upon the surface in the required place for it to dry without being handled. As the molds ascend the groove *p*, the pins *i i'* strike alternately against the switch *r* and enter their respective grooves *o* and *n* by which they are again guided around over the drums G.

By the above simple machine I am enabled to mold the bricks and at the same time deposit them in the required position on the ground where they are to be dried.

What I claim as my invention and desire to secure by Letters Patent is,

The combination with the molds E, of the frame A, and hopper D, constructed, arranged, and operating together, substantially in the manner, and for the purpose herein described.

GEO. I. WASHBURN.

Witnesses:
CHAS. WASHBURN,
A. NEWBURY.